(No Model.)
H. MUELLER
ROLLER SKATE.
No. 330,847. Patented Nov. 17, 1885.
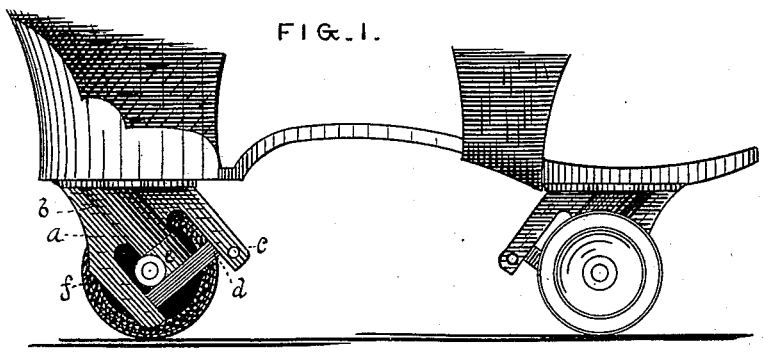
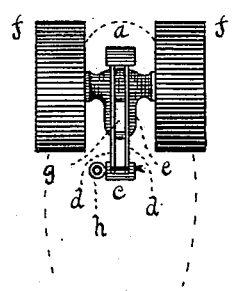
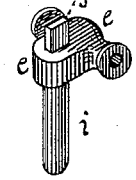
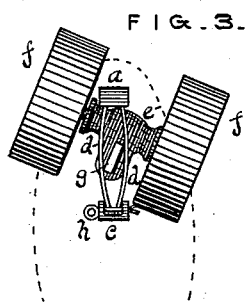
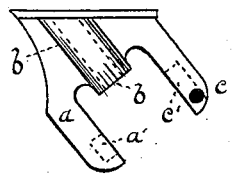
Witnesses.
W. J. Walker
J. D. Walker
Inventor.
Henry Mueller.
By L. P. Graham
atty.

UNITED STATES PATENT OFFICE.

HENRY MUELLER, OF DECATUR, ILLINOIS.

ROLLER-SKATE.

SPECIFICATION forming part of Letters Patent No. 330,847, dated November 17, 1885.

Application filed February 7, 1885. Serial No. 155,194. (No model.)

*To all whom it may concern:*

Be it known that I, HENRY MUELLER, a citizen of the United States, residing at Decatur, in the county of Macon and State of Illinois, have invented certain new and useful Improvements in Roller-Skates, of which the following is a specification.

My invention consists in certain peculiarities of construction and combination of parts, as will be hereinafter set forth and claimed.

In the drawings accompanying and forming a part of this specification, Figure 1 is a side elevation of a skate with one wheel removed in order to expose the peculiarities of my invention. Fig. 2 represents the front truck of Fig. 1 as viewed from the position of the arrow. Fig. 3 represents Fig. 2 with the axle in an extremely deflected position. Fig. 4 represents the form of the pintle on which the axle swings. Fig. 5 shows the form of spring used to hold the wheels on a line; and Fig. 6 shows the truck-frame detached from the foot-rest and divested of the wheels, axle, pintle, and springs.

$a$ and $c$ represent, respectively, a lower and an upper projection of the truck-frame, parallel with each other, and approximating an angle of forty-five degrees with the bottom of the foot-rest.

$b$ is a tubular bearing for the pintle, to which the axle is attached, located at the upper end of the truck in a position parallel with projections $a$ $c$.

$d$ represents springs extending from an oblong cavity in projection $a$ to a slot in projection $c$.

$e$ represents the axle-frame for wheels $ff$.

$g$ shows a parallel-surfaced projection on the lower extremity of pintle $i$. (See Fig. 4, where said pintle, projection, and axle-frame are shown in an inverted position.)

$h$ represents a pin used to secure the springs $d$ in the slotted end of projection $c$.

In Fig. 6 the cavity in projection $a$ is indicated by dotted lines at $a'$, and the slot in projection $c$ is also indicated by dotted lines at $c'$.

I prefer to attach the wheels to the axle-frame by means of an axle-bar passing entirely through both wheels and frame; but bearings may be formed on the frame, if preferred. The trucks are secured to the bottom of the foot-rest by means of screws, or in any suitable manner, and the various parts of my device are placed together and secured as follows: The wheels being secured to the axle in any suitable manner, pintle $i$ is placed in position in bearing $b$, the springs placed in position, as before stated, one on each side of projection $g$, and all the parts secured from misplacement by the insertion of pin $h$. It will be readily understood that under ordinary circumstances the springs tend to hold the wheels on a line one pair with the other, and that pressure on either side of the foot-rest will cause a divergence in the two sets of wheels, and a consequent progression in a curved line, this peculiarity being common to all skates in which a spring is provided and in which the wheels have a complex motion.

To prevent the wheels from coming in contact with the foot-rest when describing a short curve with the skates, some device is necessary to limit the rotation of pintle $i$. I provide this device in projection $a$ and in the arrangement of the axle with relation to the pintle. (See Fig. 3, where the rotation of the pintle is limited by contact between the axle and the projection $a$.)

By supporting my springs at both ends I lessen the liability of breakage, and this danger is further averted by using for springs simple bars or plates without holes or any configuration that will tend to weaken the same. If by any extreme chance a spring should become broken, a new one can be replaced by any one without the use of special knowledge or special tools, and, owing to the extreme simplicity of the form of the springs, any metal-worker can construct one, if necessary. As the springs work loosely in their supports or bearings, their elasticity is thereby increased, and by means of this and the plan of supporting the same at both ends the greatest degree of elasticity in a given amount of metal is attained.

Owing to the position of the springs and the manner of their support, the breakage of one spring does not entirely unfit the skate for use, as the remaining spring will continue to act perfectly to the extent of its strength and elasticity.

I claim as new and desire to secure by Letters Patent—

1. The combination, in roller-skates, of a swinging axle provided with a parallel-surfaced projection, and a pair of spring-plates secured laterally at each end and held in contact with the parallel surfaces of the projection on the axle at their longitudinal center, as and for the purpose set forth.

2. The combination, in roller-skates, of projections $a\ c$, bearing $b$, pintle $i$, provided with projection $g$, and axle-frame $e$, and springs $d$, supported at each end by $a$ and $c$, and held in contact with projection $g$ at their longitudinal center, as and for the purpose set forth.

3. The combination, in roller-skates, of projections $a\ c$, provided with cavity $a'$ and slot $c'$, respectively, bearing $b$, pintle $i$, projection $g$, axle $e$, springs $d$, and securing-pin $h$, as and for the purpose set forth.

4. The combination, in a device for limiting the swing of a pair of wheels for roller-skates, of pintle $i$, axle $e$ at right angles with said pintle, and projection $a$, adapted to act as a stop to the swing of the wheels when in substantially the position shown in Fig. 3, for the purpose set forth.

In testimony whereof I sign my name in the presence of two subscribing witnesses.

HENRY MUELLER.

Attest:
I. D. WALKER,
HIERONYMUS MUELLER.